United States Patent
O'Connor et al.

(10) Patent No.: US 8,832,032 B2
(45) Date of Patent: *Sep. 9, 2014

(54) ACCELERATION OF CLOUD-BASED MIGRATION/BACKUP THROUGH PRE-POPULATION

(71) Applicant: Dell Products, L.P., Round Rock, TX (US)

(72) Inventors: Clint H. O'Connor, Austin, TX (US); Michael Haze, Round Rock, TX (US); Yuan-Chang Lo, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/915,669

(22) Filed: Jun. 12, 2013

(65) Prior Publication Data

US 2014/0019584 A1   Jan. 16, 2014

Related U.S. Application Data

(63) Continuation of application No. 13/549,982, filed on Jul. 16, 2012, now Pat. No. 8,468,139.

(51) Int. Cl.
*G06F 17/00* (2006.01)
*G06F 17/30* (2006.01)
*G06F 21/00* (2013.01)
*H04L 29/08* (2006.01)
*G06F 11/20* (2006.01)

(52) U.S. Cl.
CPC ...... *H04L 67/1095* (2013.01); *G06F 17/30079* (2013.01); *G06F 11/2041* (2013.01); *G06F 21/00* (2013.01); *G06F 11/2035* (2013.01)
USPC .......................................................... 707/654

(58) Field of Classification Search
None
See application file for complete search history.

(56) References Cited

U.S. PATENT DOCUMENTS

| 5,442,541 A | 8/1995 | Hube et al. |
| 5,490,216 A | 2/1996 | Richardson, III |
| 5,659,614 A | 8/1997 | Bailey, III |
| 5,715,314 A | 2/1998 | Payne et al. |

(Continued)

OTHER PUBLICATIONS

LAPLINK, Laplink Offers Licensing for Windows XP to Windows 7 Upgrade Solution, Oct. 28, 2009.

(Continued)

*Primary Examiner* — Sherief Badawi
*Assistant Examiner* — Courtney Harmon
(74) *Attorney, Agent, or Firm* — Terrile, Cannatti, Chambers & Holland, LLP; Stephen A. Terrile

(57) ABSTRACT

A system, method, and computer-readable medium are disclosed for performing automated, cloud-based migrations of entitled digital assets. A set of entitlement data corresponding to a set of digital assets installed on a first system is processed with a set of digital asset source data to generate an equivalent set of digital assets. A first identifier associated with the source system is then cross-referenced to a second identifier associated with a target system. The second identifier and the set of entitlement data are processed to generate a second set of digital asset entitlements entitling the target system to use the set of equivalent digital assets. A migration request and the second identifier are then processed to provide the set of equivalent digital assets to the target system.

18 Claims, 11 Drawing Sheets

(56) References Cited

U.S. PATENT DOCUMENTS

| | | | |
|---|---|---|---|
| 5,864,664 A | 1/1999 | Capps, Jr. et al. |
| 5,948,078 A | 9/1999 | Joffe |
| 5,956,505 A | 9/1999 | Manduley |
| 6,032,859 A | 3/2000 | Muehlberger et al. |
| 6,170,059 B1 | 1/2001 | Pruett et al. |
| 6,209,089 B1 | 3/2001 | Selitrennikoff et al. |
| 6,292,941 B1 | 9/2001 | Jollands |
| 6,301,612 B1 | 10/2001 | Selitrennikoff et al. |
| 6,314,418 B1 | 11/2001 | Namba |
| 6,321,262 B1 | 11/2001 | Springer |
| 6,324,525 B1 | 11/2001 | Kramer et al. |
| 6,389,403 B1 | 5/2002 | Dorak, Jr. |
| 6,425,126 B1 | 7/2002 | Branson et al. |
| 6,502,205 B1 | 12/2002 | Yanai et al. |
| 6,647,532 B1 | 11/2003 | Boede et al. |
| 6,694,384 B1 | 2/2004 | Moeller et al. |
| 6,865,655 B1 | 3/2005 | Andersen |
| 6,931,558 B1 | 8/2005 | Jeffe et al. |
| 7,047,411 B1 | 5/2006 | DeMello et al. |
| 7,120,593 B1 | 10/2006 | Fry et al. |
| 7,330,997 B1 | 2/2008 | Odom |
| 7,352,999 B2 | 4/2008 | Miettinen |
| 7,412,534 B2 | 8/2008 | Tsang et al. |
| 7,417,546 B2 | 8/2008 | Llorca et al. |
| 7,428,413 B2 | 9/2008 | Fink |
| 7,444,436 B2 | 10/2008 | Wille |
| 7,483,860 B2 | 1/2009 | Cronce et al. |
| 7,496,739 B1 | 2/2009 | Raghavan et al. |
| 7,503,072 B2 | 3/2009 | Hughes et al. |
| 7,506,382 B2 | 3/2009 | Padole et al. |
| 7,516,104 B1 | 4/2009 | Scardino |
| 7,523,072 B2 | 4/2009 | Stefik et al. |
| 7,526,451 B2 | 4/2009 | Park et al. |
| 7,546,545 B2 | 6/2009 | Garbow et al. |
| 7,555,447 B2 | 6/2009 | Chinnappan et al. |
| 7,565,325 B2 | 7/2009 | Lenard et al. |
| 7,593,898 B1 | 9/2009 | Tsuei et al. |
| 7,783,737 B2 | 8/2010 | Fujino et al. |
| 7,971,199 B1 | 6/2011 | Chen |
| 8,219,769 B1 | 7/2012 | Wilk |
| 8,219,850 B1 | 7/2012 | Wang et al. |
| 8,341,455 B2 | 12/2012 | Maki et al. |
| 8,452,731 B2 | 5/2013 | Preslan et al. |
| 8,533,156 B2 | 9/2013 | Ryder |
| 2002/0046232 A1 | 4/2002 | Adams et al. |
| 2002/0059270 A1 | 5/2002 | Schlabach et al. |
| 2002/0076204 A1 | 6/2002 | Nakano et al. |
| 2002/0077986 A1 | 6/2002 | Kobata et al. |
| 2002/0088855 A1 | 7/2002 | Hodes |
| 2003/0028439 A1 | 2/2003 | Cox |
| 2003/0028451 A1 | 2/2003 | Ananian |
| 2003/0033205 A1 | 2/2003 | Nowers et al. |
| 2003/0060157 A1 | 3/2003 | Henrick |
| 2003/0088571 A1 | 5/2003 | Ekkel |
| 2003/0110126 A1 | 6/2003 | Dunkeld et al. |
| 2003/0120928 A1 | 6/2003 | Cato et al. |
| 2003/0149750 A1 | 8/2003 | Franzenburg |
| 2004/0003039 A1 | 1/2004 | Humphrey et al. |
| 2004/0022227 A1 | 2/2004 | Lynch et al. |
| 2004/0059938 A1 | 3/2004 | Hughes et al. |
| 2004/0093273 A1 | 5/2004 | Laurent et al. |
| 2004/0128551 A1 | 7/2004 | Walker et al. |
| 2004/0143746 A1 | 7/2004 | Ligeti et al. |
| 2004/0250066 A1 | 12/2004 | Di Luoffo et al. |
| 2004/0268267 A1 | 12/2004 | Moravcsik |
| 2005/0027657 A1 | 2/2005 | Leontiev et al. |
| 2005/0060388 A1 | 3/2005 | Tatsumi et al. |
| 2005/0229047 A1 | 10/2005 | Hanes et al. |
| 2005/0262573 A1 | 11/2005 | Bo et al. |
| 2005/0268115 A1 | 12/2005 | Barde et al. |
| 2006/0062426 A1 | 3/2006 | Levy et al. |
| 2006/0161635 A1 | 7/2006 | Lamkin et al. |
| 2006/0229904 A1 | 10/2006 | Hunter et al. |
| 2006/0276174 A1 | 12/2006 | Katz et al. |
| 2007/0124349 A1 | 5/2007 | Taylor |
| 2007/0130233 A1 | 6/2007 | Christensen |
| 2007/0157196 A1 | 7/2007 | Goicea et al. |
| 2007/0174621 A1 | 7/2007 | Ducharme |
| 2007/0233580 A1 | 10/2007 | Pike et al. |
| 2007/0255758 A1 | 11/2007 | Zheng et al. |
| 2007/0294566 A1 | 12/2007 | Solyanik |
| 2008/0172583 A1 | 7/2008 | Mahajan et al. |
| 2008/0177807 A1 | 7/2008 | Dile et al. |
| 2008/0195871 A1 | 8/2008 | Peinado et al. |
| 2008/0208933 A1 | 8/2008 | Lyon |
| 2008/0215633 A1 | 9/2008 | Dunkeld et al. |
| 2009/0083843 A1 | 3/2009 | Wilkinson et al. |
| 2009/0089340 A1 | 4/2009 | Ohr et al. |
| 2009/0125393 A1 | 5/2009 | Hwang et al. |
| 2009/0164470 A1 | 6/2009 | Savage et al. |
| 2009/0187491 A1 | 7/2009 | Bull et al. |
| 2009/0193102 A1 | 7/2009 | Trujillo |
| 2009/0228368 A1 | 9/2009 | Brown |
| 2009/0228488 A1 | 9/2009 | Brand et al. |
| 2009/0234892 A1 | 9/2009 | Anglin et al. |
| 2009/0248883 A1 | 10/2009 | Suryanarayana et al. |
| 2009/0265545 A1 | 10/2009 | Satoh et al. |
| 2009/0300719 A1* | 12/2009 | Ferris ............................... 726/3 |
| 2010/0106687 A1 | 4/2010 | Marcy et al. |
| 2010/0106691 A1 | 4/2010 | Preslan et al. |
| 2010/0122030 A1 | 5/2010 | Peters et al. |
| 2010/0125903 A1* | 5/2010 | Devarajan et al. ............. 726/15 |
| 2010/0146425 A1 | 6/2010 | Lance et al. |
| 2010/0174918 A1 | 7/2010 | Hoffman et al. |
| 2010/0235921 A1 | 9/2010 | Foster |
| 2010/0257142 A1 | 10/2010 | Murphy et al. |
| 2010/0257185 A1 | 10/2010 | Dvir et al. |
| 2010/0257346 A1 | 10/2010 | Sosnosky et al. |
| 2010/0257403 A1 | 10/2010 | Virk et al. |
| 2010/0306227 A1 | 12/2010 | Fleming et al. |
| 2010/0306267 A1 | 12/2010 | Zamkoff et al. |
| 2010/0325735 A1 | 12/2010 | Etchegoyen |
| 2011/0016466 A1 | 1/2011 | Liu et al. |
| 2011/0022812 A1 | 1/2011 | van der Linden et al. |
| 2011/0072291 A1 | 3/2011 | Murase |
| 2011/0099200 A1 | 4/2011 | Blount et al. |
| 2011/0173405 A1 | 7/2011 | Grabarnik et al. |
| 2011/0184998 A1 | 7/2011 | Palahnuk et al. |
| 2011/0246766 A1* | 10/2011 | Orsini et al. .................. 713/160 |

OTHER PUBLICATIONS

Backup P2P Secured peer to peer backup, http://www.ohloh.net/p/p2pbackupsmile, printed Jun. 18, 2010.

Landers et al., PeerStore: Better Performance by Relaxing in Peer-to-Peer Backup, Fakultät Für Informatik, Technische Universität München, 2004 http://www.computer.org/portal/web/csdl/doi/10.1109/PTP.2004.1334933.

Peer-to-Peer Viral Backup: Cucku 2.0 Definitely Scores Points for Imagination, http://www.fileslinger.com/2009/05/peer-to-peer-viral-backup-cucku-20-definitely-scores-points-forimagination, printed Jun. 18, 2010.

T. Bonkenburg et al, LifeBoat—An Autonomic Backup and Restore Solution, http://www.usenix.org/event/lisa04/tech/full_papers/bonkenburg/bonkenburg.pdf, 2004 LISA XVIII—Nov. 14-19, 2004—Atlanta, GA.

M. Vrable, Cumulus: Filesystem Backup to the Cloud, http://cseweb.ucsd.edu/~voelker/pubs/cumulus-fast09.pdf, Feb. 26, 2009.

L. Mearian, Start-up unveils hybrid cloud/on-site backup service, http://www.itworld.com/storage/64972/start-unveils-hybrid-cloudon-site-backup-service, Mar. 24, 2009.

Storage-Switzerland.com, Hybrid Cloud Backup for the SMB, http://www.storage-switzerland.com/Articles/Entries/2009/4/24_Hybrid_Cloud_Backup_for_the_SMB.html, Apr. 24, 2009.

M. Staimer, Asigra, Why Cloud Backup/Recovery (Private, Public, or Hybrid) Will be Your Data Protection, http://www.docstoc.com/docs/16851799/Why-Cloud-Backup-Recovery-(Private—Public—or-Hybrid)-WILL-be, printed Jun. 18, 2010.

CISCO License Manager 2.2, http://www.cisco.com/en/US/products/ps7138/index.html, printed Jun. 15, 2010.

(56) References Cited

OTHER PUBLICATIONS

PROQUEST, Sprint and MercuryMD Team Up to Offer Healthcare Providers One-Stop Shopping Opportunity for Mobility Solutions, PR Newswire. New York: Apr. 27, 2004. p. 1; http://proquest.umi. com/pqdweb?did=624136671 &sid=4&Fmt=3&clientId=19649 &RQT =309& VName=POD.

Michigan Retailers Association, Member Services, Electronic Gift Card Processing FAQ, http://www.retailers.com/memberservices/giftcardsfaq.html, printed Apr. 19, 2010.

* cited by examiner

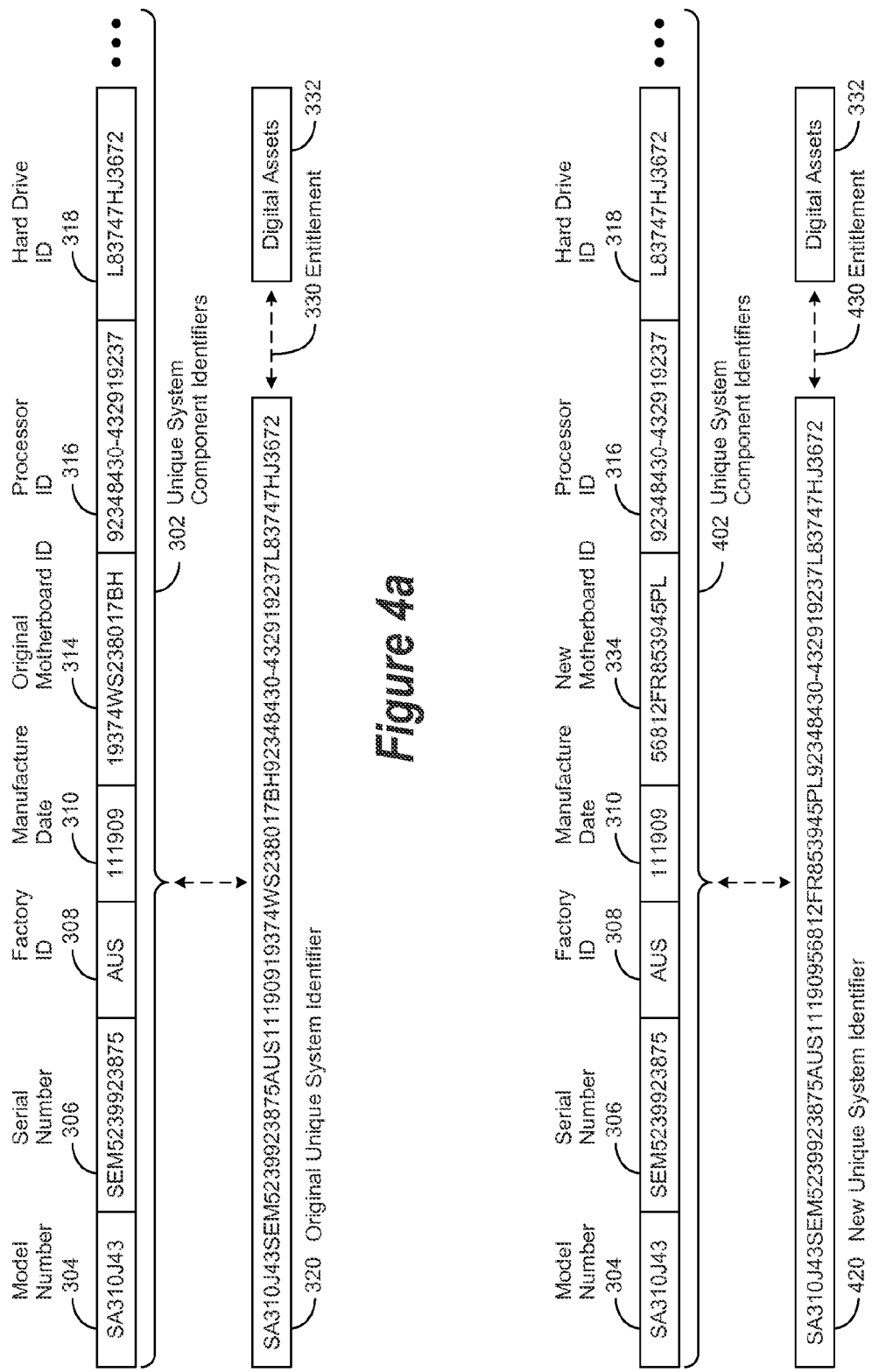

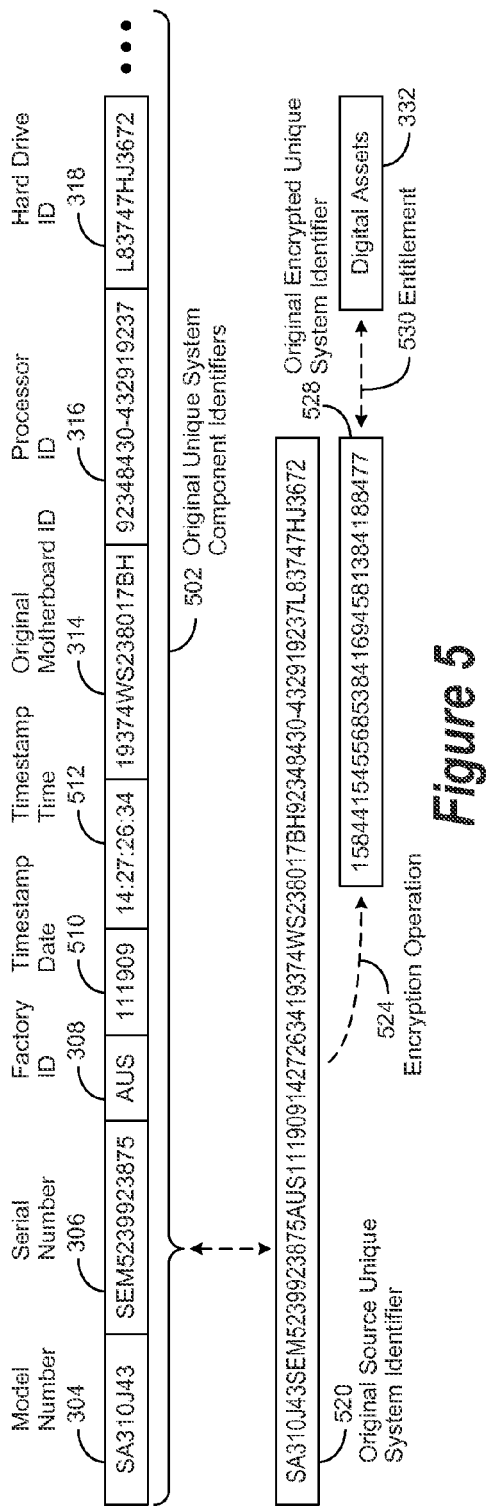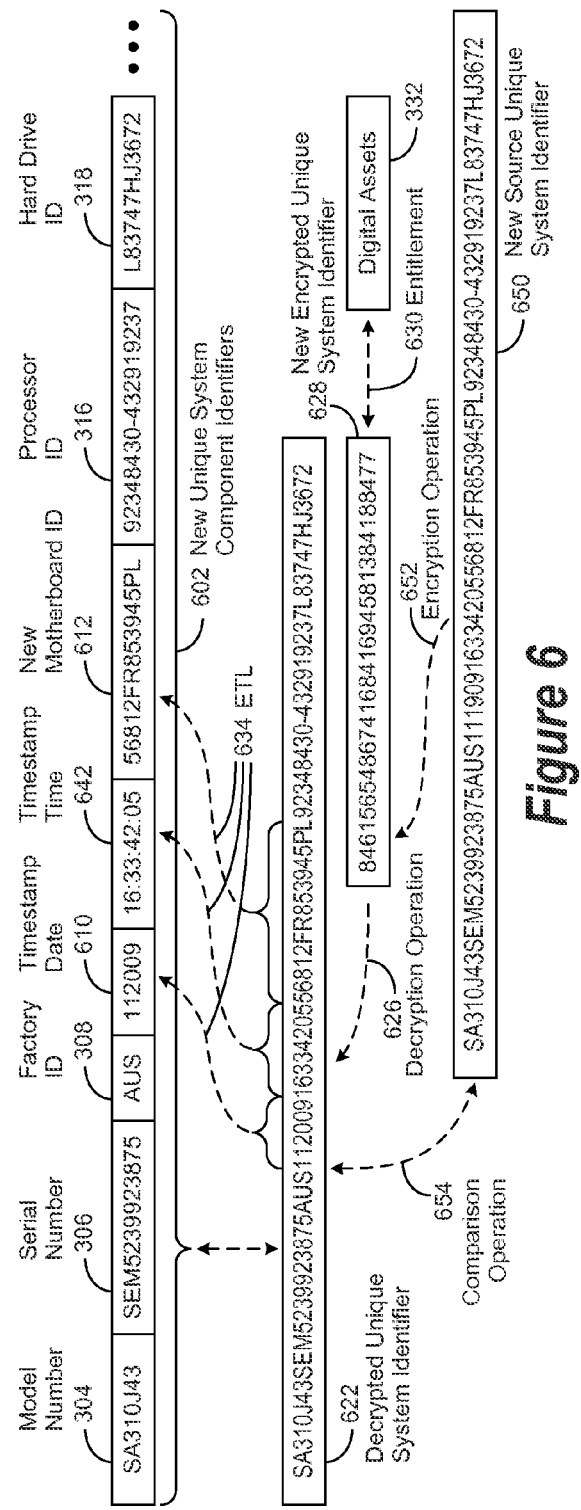

ACCELERATION OF CLOUD-BASED MIGRATION/BACKUP THROUGH PRE-POPULATION

BACKGROUND OF THE INVENTION

1. Field of the Invention

The present invention relates to the management of information handling systems. More specifically, embodiments of the invention provide a system, method, and computer-readable medium for performing automated, cloud-based migrations of entitled digital assets.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, it has become common for manufacturers to offer purchasers the ability to order a system custom-configured to their specification. These custom-configured systems, which are often ordered on-line, allow the purchaser to select the OS of their choice along with a selection of software and other digital assets to meet their individual needs. In some cases, the manufacturer may preinstall the OS and the selected digital assets on the system prior to delivery. In addition, the system may be further personalized (e.g., desktop themes and colors, etc.) as a service to the customer. Such customizations and personalizations may be limited only by the customer's patience and willingness to define or describe their ideal system.

However, the process of migrating digital assets from one system to another is a fairly complex process that poses challenges to many users and can add hesitation when purchasing a new system. Furthermore, users have limited choices for migrating software and digital assets from an existing system to a newly purchased system. For example, a user can purchase additional software for migration, leverage limited utilities within the operating system, manually transfer files, or simply leave behind existing data.

As a result, the customer has to locate the original distribution media and license keys that came with the existing system or were purchased later. In the event of downloaded digital assets, the purchaser typically has to find back-up copies of the original downloaded files and mails that contain the associated license key's. If they are not located, or if they were lost due to a system failure such as a crashed hard drive, the purchaser has to log-on to the digital assets provider site, download the files again, and then perform an authentication routine to receive the license keys via email. Moreover, it is not uncommon for users to misplace or forget their User IDs and passwords. Online-driven migration has the potential to address some of these issues, but it typically involves moving massive amounts of data. Upload speeds are often one-tenth the rate of download speeds, so it can often take days to upload the contents of a hard drive using a purely online experience. In view of the foregoing, there is a need for more easily migrating digital assets from an existing system to anew system without requiring the user to provide installation files and associated license keys.

SUMMARY OF THE INVENTION

A system, method, and computer-readable medium are disclosed for performing automated, cloud-based migrations of entitled digital assets. In various embodiments, a first personalization agent is installed on a source system comprising a first unique system identifier and a second personalization agent is installed on a target system comprising a second unique system identifier. The first unique system identifier and a set of digital asset entitlement data, which corresponds to a first set of digital assets installed on the source system, is then provided by the first personalization agent to a digital asset entitlement system.

The set of digital asset entitlement data is then processed by the digital asset entitlement system, along with a set of digital asset source data, to generate a second set of digital assets that are equivalent to the first set of digital assets. The first unique identifier and the first set of digital asset entitlement data are then processed to generate a first set of digital asset entitlements entitling the second system to use the second set of digital assets. The first unique system identifier is then cross-referenced to the second system identifier.

The second personalization agent installed on the target system then provides the digital asset entitlement system the second unique system identifier and a request to migrate the second set of digital assets to the second system. In response, the digital asset entitlement system provides the second set of digital assets to the second system. The unique identifiers of the source and target system are then processed with the set of digital asset entitlement data to disentitle the source system from using the migrated digital assets.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4a-b are a simplified block diagram of a unique system identifier that is changed when one of its associated system component identifiers has been changed;

FIG. 5 is a simplified block diagram of an encrypted unique system identifier generated from a set of system component identifiers;

FIG. 6 is a simplified block diagram of a unique system identifier decrypted from an encrypted unique system identifier;

DETAILED DESCRIPTION

A system, method, and computer-readable medium are disclosed for performing automated, cloud-based migrations of entitled digital assets. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
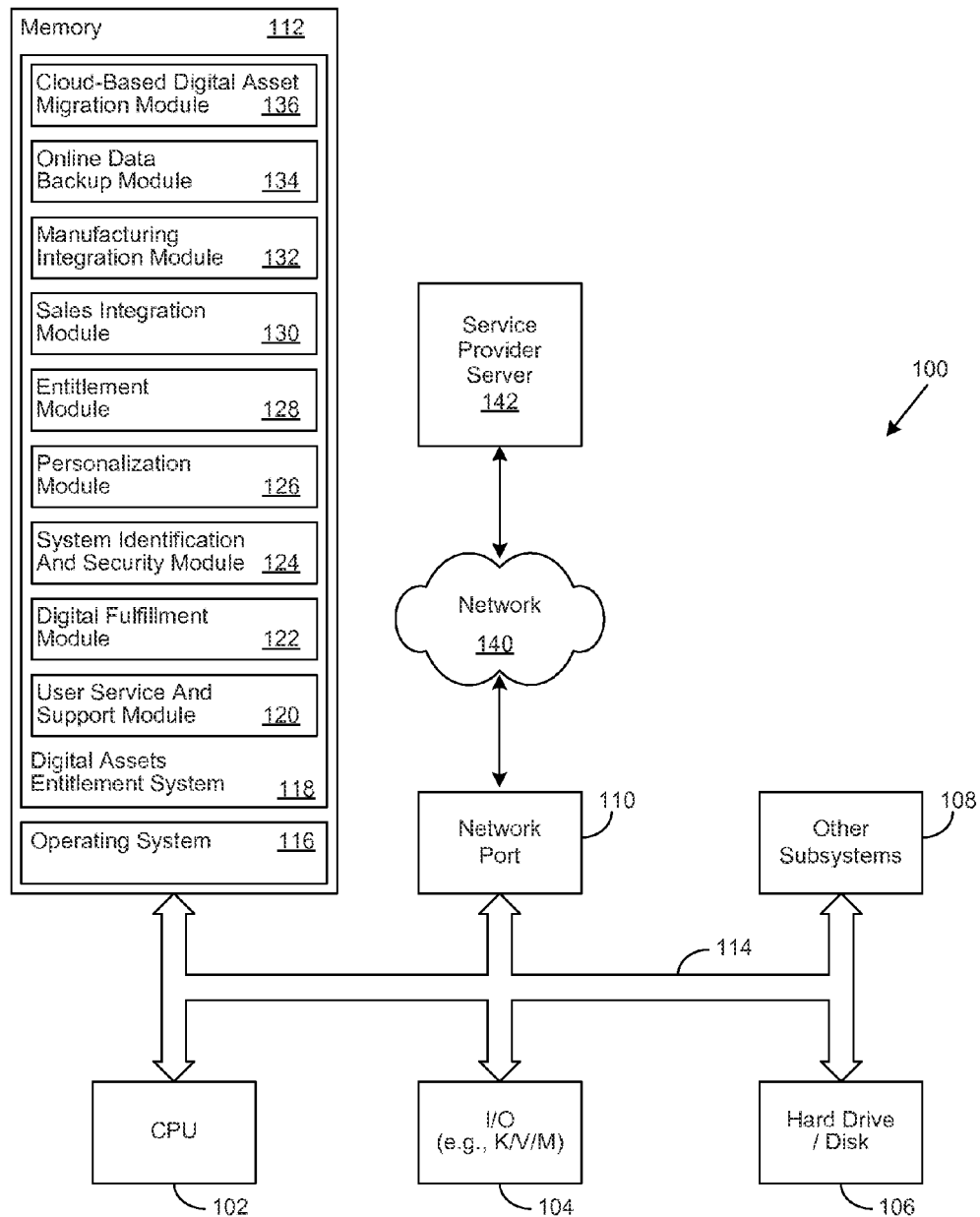
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a digital asset entitlement system 118. In these and other embodiments, the digital asset entitlement system 118 may likewise comprise a user service and support module 120, a digital fulfillment module 122, a system identification and security module 124, a personalization module, an entitlement module 128, a sales integration module, a manufacturing integration module 132, an online data backup module, and a cloud-based digital asset migration module 136. In one embodiment, the information handling system 100 is able to download the digital asset entitlement system 118 from the service provider server 142. In another embodiment, the digitals asset entitlement system 118 is provided as a service from the service provider server 142.

Figure 2:
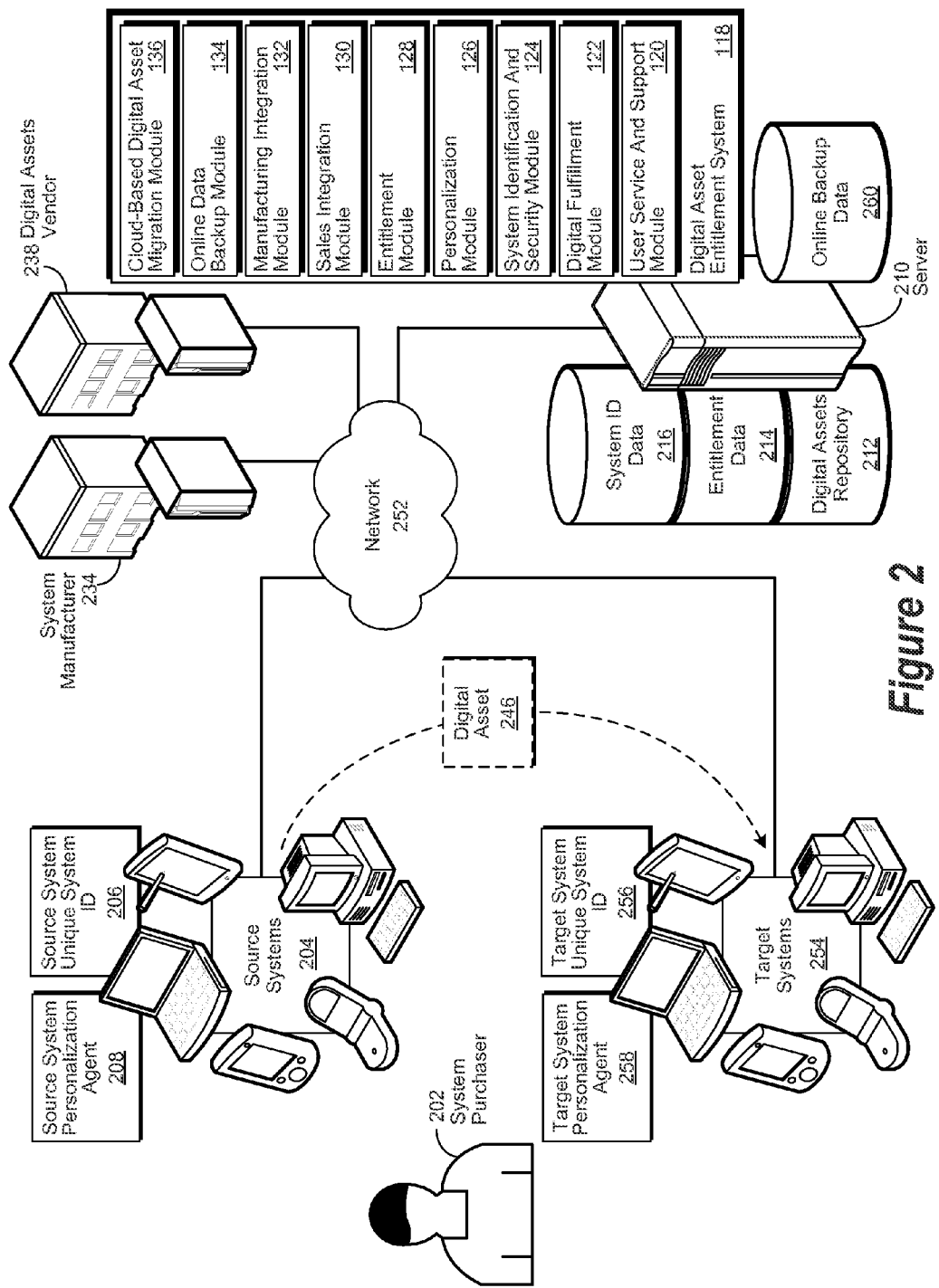
FIG. 2 is a simplified block diagram of the performance of cloud-based digital assets migration operations.

FIG. 2 is a simplified block diagram of the performance of cloud-based digital assets migration operations. In various embodiments, the migration of digital assets from a source system to a target system is facilitated by first pre-creating a partial data set at a remote server, such as a server operated by an online backup service operating "in the cloud." In these and various other embodiments, the partial data set contains some, but not all, of the digital assets residing on a source system. As described in greater detail herein, the partial data set is subsequently populated with digital assets that are either provided, or generated, from sources other than the source system.

As an example, since many non-managed operating systems are either a basic or premium edition, with or without associated software applications, an online backup account can be prepopulated with the directories and files of a typical install, avoiding the need for a full upload from the source system, which can be time-consuming. Instead, the source files for the operating system and applications care are copied from another source, such as the data center providing the online backup service. Skilled practitioners of the art will be aware that many digital assets will have a typical installation profile. Accordingly, those digital assets can simply be copied over the file-based image resulting from the online backup. These same practitioners of the art will likewise recognize that while the resulting pre-created backup image may not exactly match the source system, it is not important as the next online backup synchronization will detect differences in the respective image and upload the differences. It will likewise be appreciated that these differences would be much smaller than if the online backup image was not prepopulated with the data assets either provided or generated from digital asset source files. Furthermore, the amount of time typically needed to create the online backup image will be reduced as only a portion of the digital assets are uploaded from the source system.

Referring now to FIG. 2, a digital asset entitlement system 118 is implemented for managing the entitlement of a system 204 to process a digital asset 246, these and other embodiments, the digital asset entitlement system 218 may be implemented on one or more servers 210, which are connected to a network 252. In various embodiments, the network 252 may comprise a public network, such as the Internet, a physical private network, a virtual private network (VPN), or any combination thereof. As shown in FIG. 2, the digital asset entitlement system 118 comprises a user service and support module 120, a digital fulfillment module 122, and a system identification and security module 124. The digital asset entitlement system 118 likewise comprises a personalization module 126, an entitlement module 128, a sales integration module 130, a manufacturing integration module 132, an online data backup module 134, and a cloud-based digital asset migration module 136. Likewise, the digital asset entitlement system 118 is able to access a digital assets data repository 212, an entitlement data repository 214, a system identifier (ID) data repository 216, and an online backup data repository 260, each of which may be implemented on one or more servers 210 connected to a network 252.

As used herein, a digital asset 246 refers to any digital asset such as a software application, a deliverable or performable service, music, video, software activation key, personalization instructions, files, etc. that are digitally deliverable either wholly or partially. As likewise used herein, a digital assets entitlement refers to the association of a predetermined digital asset 246 with either a source 204 or target 254 system. In various embodiments, an entitlement record contains digital assets entitlement data (e.g., license information, etc.) that allows the digital asset 246 to be respectively processed by the source 204 or target 254 system, which are likewise respectively identified by a corresponding unique source 206 or target 256 system identifier. In these and other embodiments, the entitlement record is processed by the entitlement module 128 and stored in the entitlement data repository 214. As used herein, a source 204 or target 25.4 system may comprise a personal computer, a laptop computer, or a tablet computer operable to establish an on-line session with the digital asset entitlement system 118 over a connection to network 252. The source 204 or target 254 system may also comprise a personal digital assistant (PDA), a mobile telephone, or any other suitable device operable to store a unique source 204 or target 254 system ID, respectively perform digital asset entitlement operations with a source 208 or target 258 system personalization agent, and operable to establish a connection with network 252.

In various embodiments, digital assets entitlement and system personalization operations are performed by a user, such as a system purchaser 202, in on-line environment. As an example, an on-line environment may comprise a system manufacturer 234 or digital assets vendor 238 that respectively accepts on-line orders for systems or digital assets over a connection to network 252.

If these and other embodiments, the system purchaser 202 decides whether to purchase a custom-configured or pre-configured target 254 system. If the target 254 system is to be pre-configured, then it is selected for on-line purchase by the system purchaser 202 and its unique target system 256 identifier is determined. In one embodiment, the unique target 256 system identifier is stored in the BIOS of the pre-configured target 254 system. However, if the target 254 system is to be custom-configured, then it is custom-configured on-line by the system purchaser 202. Once manufactured by the system manufacturer 234, a unique target 256 system identifier is generated as described in greater detail herein.

In various embodiments, the manufacturing integration module 132 coordinates the custom configuration of the target 254 system with the system manufacturer 234. Likewise, the system identification and security module 124 coordinates the generation of the unique target 256 system identifier and its storage in the repository of system identifier data 216. The system purchaser 202 then selects one or more digital assets 246 for on-line purchase, followed by selecting personalization options for the pre-configured or custom-configured system. In various embodiments, the personalization module 126 coordinates the selection of personalization options with the system manufacturer 234 or digital assets vendor 238. As used herein, a system personalization option refers to any feature, capability, or function that may be applied to a target system. As an example, a personal computer desktop wallpaper or user interface options (e.g., a "classic" interface) are personalization options.

A purchase transaction for the custom-configured or pre-configured system target 254 system and any associated digital assets 246 and personalization options is then completed. In various embodiments, the processing of the purchase transaction is performed by the sales integration module 230. In these and other embodiments, the financial proceeds of the purchase transaction may be settled between multiple parties. For example, a system manufacturer 234 may receive a portion of the purchase transaction corresponding to the cost of the target 254 system. One or more digital assets vendors 238 may likewise receive a proportionate share of the purchase transaction corresponding to the digital assets 246 they respectively provide.

Digital asset entitlement operations, as described in greater detail herein, are then performed by the digital asset entitlement system 118 to bind the digital assets 246, the personalization options, and their respective digital assets entitlement data to the unique target 256 system identifier of the target 254 system. The resulting digital asset entitlements, including data associated with the digital assets (e.g., installation files, etc.) is then stored in the repository of entitlement data 214.

The digital asset migration module 134 then presents the system purchaser 202 an option to opt-in to perform automated, cloud-based migration of entitled digital assets from the source 204 system to the target 254 system. If the system purchaser 202 elects to opt-in, then a determination is made whether a source 208 system personalization agent is loaded on the source 204 system. If not, then it is loaded onto the source 208 system. In one embodiment, the source 208 system personalization agent is loaded onto the source 204 system by the personalization module 126. The source 208 system personalization agent queries the source 204 system to determine its unique source 206 system identifier. Inventory operations are then performed by the source 208 system personalization agent to inventory digital assets and any associated digital assets entitlement data installed on the source 204 system. In various embodiments, the inventoried digital assets 246 may comprise personalization settings and authentication credentials.

The inventoried digital assets 246 and associated digital assets entitlement data are then presented to the system purchaser 202, who then selects digital assets 246 to be migrated to the target 254 system. The source 208 system personalization agent then automatically establishes a connection with the digital asset entitlement system 118 and uses the unique source 206 system identifier to authenticate the source 204 system. The unique source 208 system personalization agent then uploads the inventoried digital assets entitlement and connectivity data associated with the source 204 system. The digital asset entitlement system 118 then performs comparison operations between the digital assets 246 and the digital assets entitlement data respectively corresponding to the unique source 206 and target 256 system identifiers of the source 204 and target 254 systems.

A determination is then made whether any digital asset entitlement data associated with the inventoried digital assets 246 installed on the source 204 system is missing. If it is determined that any digital asset entitlement data is missing, then the system purchaser 202 is prompted to provide the missing digital asset entitlement data (e.g., missing license keys) that is associated with the inventoried digital assets 246 currently associated with the unique source 206 system identifier.

Once any missing digital asset entitlement data has been provided by the system purchaser 202, further comparison operations are performed to determine which of the inventoried digital assets do not having corresponding digital asset source files stored on the digital asset entitlement system 118. As used herein, corresponding digital asset source files refer to source files (e.g., source code, executable files, scripts, music files, video files, etc.) that are either duplicates, or equivalent to, the source files used to generate the digital assets currently stored on the source system. In various embodiments, these corresponding digital asset source files are stored in the digital assets repository 212.

A partial online backup is then created on the digital asset entitlement system 118 by uploading digital assets 246 that do not have corresponding source files. For example, user-generated (e.g., word processing, spreadsheet, database, etc.) files may not have a corresponding source file. In one embodiment, such digital assets may have been uploaded to the digital asset entitlement system 118 in prior online backup sessions. In this and other embodiments, the online backup operations are performed by the online data backup module 134, which works in conjunction with the source system personalization agent 208. The aforementioned corresponding data asset source files are then retrieved and then processed to generate digital assets 246 equivalent to those currently residing on the source system 204. In certain embodiments, the generated digital assets result in one or more software images familiar to those of skill in the art. In various embodiments, the previously-uploaded and previously-generated digital assets are stored in the repository of online backup data 260.

Digital asset entitlements are then generated for both the previously uploaded digital assets 246 and the previous generated equivalent digital assets 246. In various embodiments, the digital asset entitlements are generated by performing digital asset entitlement operations, as described in greater detail herein, to bind the digital assets 246, the personalization options, and their respective digital assets entitlement data to the unique system identifier 256 of the target 254 system. The resulting digital asset entitlements for the target 254 system are then stored in the digital asset entitlement system 118. The unique system identifier 256 of the target system is then cross-referenced to the unique system identifier 206 of the source system within the digital asset entitlement system. The custom-configured or pre-configured system is delivered to the system purchaser. In various embodiments, the entitlement module 128 generates, and then processes, the digital assets entitlement data and the user service and support module 120 coordinates the delivery of the target 254 system to the system purchaser 202.

Standard operating system (OS) out-of-the-box-experience (OOBE) or hypervisor boot operations are performed on the target 254 system, followed by activating the target 258 system personalization agent. In various embodiments, the target 258 system personalization agent has a unique identifier that is associated with one or more unique system component identifiers. In one embodiment, the unique identifier of the target 258 system personalization agent is uniquely associated with the current unique target 256 system identifier associated with the target 254 system. In another embodiment, a portion of the target 258 system personalization agent is delivered to the target 258 system in an encrypted form and is then decrypted prior to being loaded on the target 254 system. In this embodiment, the primary system identifier (e.g., service tag number, serial number, etc.), is used as a decryption key to decrypt the target 258 system personalization agent.

In various other embodiments, secondary system identifiers are stored on the target 254 system (e.g., in the BIOS, in Flash memory, on a hard disk, etc.) as well as in the digital asset entitlement system 118. In these and other embodiments, the digital asset entitlement system 118 uses the secondary system identifiers to encrypt a portion of the target 258 system personalization agent before it is loaded onto the target 254 system. Once activated, the unencrypted portion of the target 258 system personalization agent uses the secondary system identifiers stored on the target 254 system to decrypt the encrypted portion of the target 258 system personalization agent. In one embodiment, the secondary system identifiers are likewise encrypted and are first decrypted before they are used to decrypt the encrypted portion of the target 258 system personalization agent. In another embodiment, the secondary system identifiers are stored in a Trusted Platform Module (TPM). Skilled practitioners of the art will recognize that many such embodiments are possible and the foregoing is not intended to limit the spirit, scope, or intent of the invention.

The target 258 system personalization agent then queries the target 254 system for its unique target 256 system identifier. In various embodiments, the unique system identifier associated with the target 254 system is stored in the target 254 system's BIOS, flash memory, a hard disk, or other memory device. However, if hypervisor (e.g., virtual machine monitor, or VMM) first boot operations are performed on the target 254 system instead, then a service OS comprising an embedded virtual machine monitor (VMM) and an embedded target 258 system personalization agent are loaded on the target 254 system. The target 258 system personalization agent then automatically establishes a connection with the digital asset entitlement system 118 and uses the target 254 system's unique target 256 system identifier to authenticate it to the digital asset entitlement system 118.

The unique target 256 system identifier is then used by the target 258 system personalization agent loaded on the target 254 system to determine its entitled digital assets, including OS and personalization options. In various embodiments, the OS and personalization options are contained in an entitled digital assets and personalization options virtual software image corresponding to the unique target 256 system identifier. In these and other embodiments, the virtual software image comprises an operating system, such a Windows variant produced by Microsoft® Inc., or a Linux OS variant. In certain of these embodiments, such virtual software images may contain additional digital assets 246, such as software applications and digital content, which may be associated with a predetermined user of the system. As an example, a user in an accounting department may be associated with a virtual software image comprising a Windows® OS variant and a financial software application. As another example, a user in an engineering department may be associated with a virtual software image comprising a Linux OS variant and a computer-aided-design (CAD) software application. Skilled practitioners of the art will realize that many such embodiments are possible and that the foregoing are not intended to limit the spirit, scope or intent of the invention.

Once the entitled digital assets 246 for the target 254 system are determined, the corresponding virtual software image comprising personalization option settings and digital assets, along with their associated digital assets entitlement data, is downloaded to the target system 254. Once downloaded, the target 258 system personalization agent provisions the target system 254 by using the digital assets entitlement data to install the virtual software image. The target 258 system personalization agent then places a request with the digital asset entitlement system 118 to migrate the previously-identified digital assets 246 currently residing on the source system 204 to the target system 254. In response, the source system 208 personalization agent installed on the source system 204 performs a final online backup synchronization operation with the digital asset entitlement system 118 to accommodate any changes to the digital assets 246 residing on the source 204 system since its last online backup. The target 258 system personalization agent then automatically installs the migrated entitled digital assets 246, which were previously entitled for use on the source 204 system to the target 254 system.

Figures 3A, 3B:
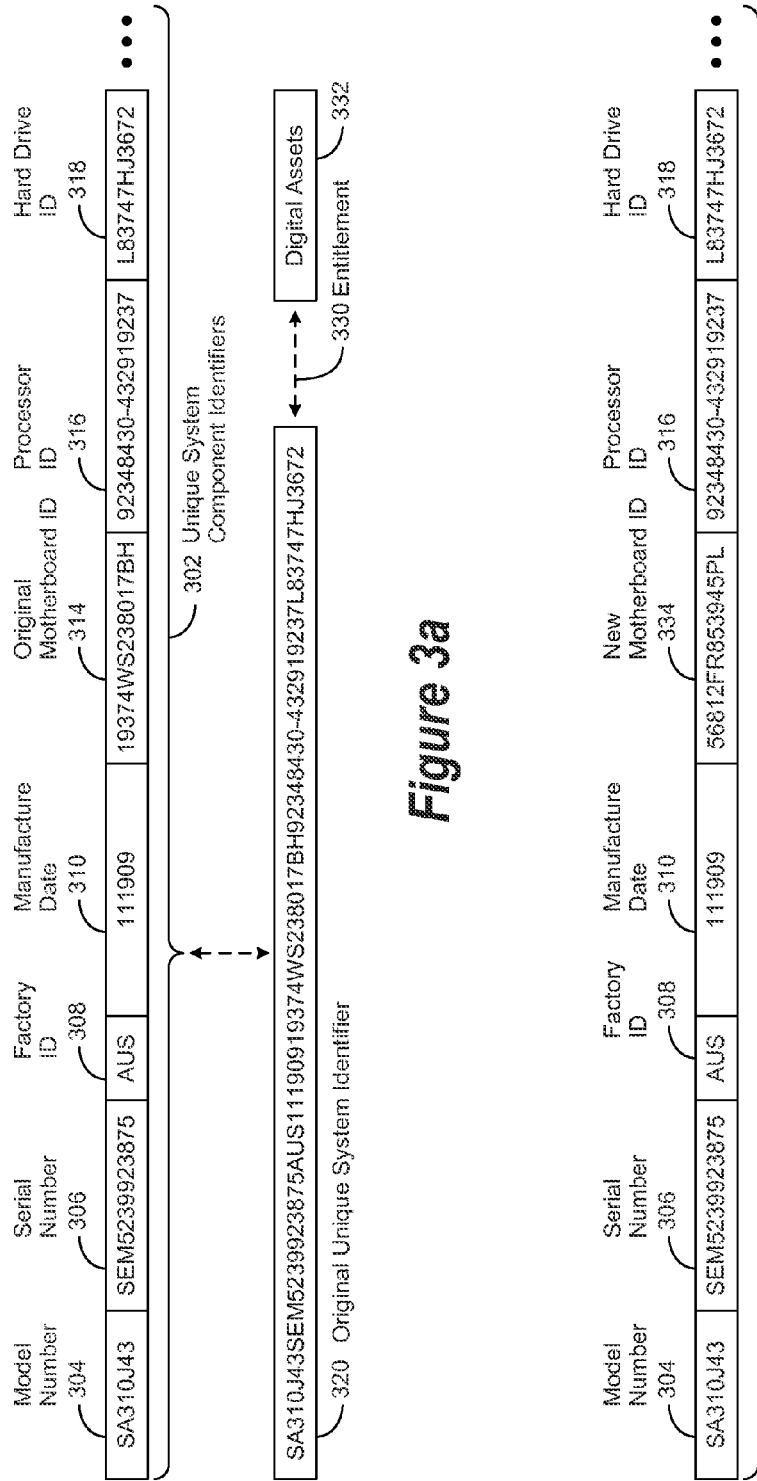
FIGS. 3a-b are a simplified block diagram of a unique system identifier that remains the same when one of its associated system component identifiers has been changed.

FIGS. 3a-b are a simplified block diagram of a unique system identifier that remains the same when one of its associated system component identifiers has been changed in accordance with an embodiment of the invention. As shown in FIG. 3a, an original unique system identifier 320 is generated from a plurality of unique system component identifiers 302, which correspond to a plurality of system components contained in a target system. As likewise shown in FIG. 3a, the unique system component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique system component identifiers 302 likewise comprise an Original Motherboard ID 314 '19374WS238017BH', a Processor ID 316 '92348430-432919237', a Hard Drive ID 318 'L83747HJ3672', etc.

As described in greater detail herein, once generated, the original unique system identifier 320 is associated, such as through a binding operation, with predetermined digital assets 332 to generate a digital assets entitlement 330. As likewise described in greater detail herein, the digital assets entitlement 330 entitles a target system, which is associated with the original unique system identifier 320, to process the digital assets 332. However, it is not uncommon for system components to be replaced due to failure, erratic performance, becoming outmoded, or for other reasons. It will be appreciated that the entitlement 330 between the original unique system identifier 320 and the digital assets 332 may be compromised as a result of such a replacement. For example, as illustrated in FIG. 3*b*, the Original Motherboard ID 314 '19374WS238017BH' has been replaced with a New Motherboard ID 334 '56812FR853945PL'. However, the original unique system identifier 320 remains unchanged.

In various embodiments, extract, transform, and load (ETL) and other database operations are performed to manage the integrity of the relationship between the original unique system identifier 320 and the plurality of unique system component identifiers 302. As an example, the Original Motherboard ID 314 '19374WS238017BH' may remain as a subset of the original unique system identifier 320, even though it may have been deactivated or invalidated as a unique system component identifier 302. However, in these and other embodiments, relational database operations known to those of skill in the art may be applied to maintain the relationship between the original unique system identifier 320, the New Original Motherboard ID 334 '56812FR853945PL', and the unchanged unique system component identifiers 302. Accordingly, the integrity of the entitlement 330 between the original unique system identifier 320 and the digital assets 332 is perpetuated. It will be apparent to skilled practitioners of the art that many such embodiments are possible and the foregoing is not intended to limit the spirit, scope, or intent of the invention.

FIGS. 4*a-b* are a simplified block diagram of a unique system identifier that is changed when one of its associated system component identifiers has been changed in accordance with an embodiment of the invention. As shown in FIG. 4*a*, an original unique system identifier 320 is generated from a plurality of unique system component identifiers 302, which correspond to a plurality of system components contained in a target system. As likewise shown in FIG. 3*a*, the unique system component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique system component identifiers 302 likewise comprise an Original Motherboard ID 314 '19374WS238017BH', a Processor ID 316 '92348430-432919237', a Hard Drive ID 318 'L83747HJ3672', etc.

As described in greater detail herein, once generated, the original unique system identifier 320 is associated, such as through a binding operation, with predetermined digital assets 332 to generate a digital assets entitlement 330. As likewise described in greater detail herein, the digital assets entitlement 330 entitles a target system, which is associated with the original unique system identifier 320, to process the digital assets 332. However, it is not uncommon for system components to be replaced due to failure, erratic performance, becoming outmoded, or for other reasons. It will be appreciated that the entitlement 330 between the original unique system identifier 320 and the digital assets 332 may be compromised as a result of such a replacement. For example, as illustrated in FIG. 4*b*, the Original Motherboard ID 314 '19374WS238017BH' has been replaced with a New Motherboard ID 334 '56812FR853945PL'. As a result, a new unique system identifier 420 is generated, which is a concatenation of the plurality of unique system component identifiers 402, including the New Original Motherboard ID 334 '56812FR853945PL' as a subset. In certain embodiments, such as when an old system is replaced with an entirety new system, none of the unique system component identifiers 402 associated with the new unique system identifier 420 are the same as the unique system component identifiers 302 associated with the original unique system identifier 320.

In various embodiments, a first set of operations are performed to remove the entitlement 330 between the original unique system identifier 320 and digital assets 332. A second set of operations are then performed to associate the new unique system identifier 420 with the digital assets 332 to generate a new entitlement 430. In these and other embodiments, the original unique system identifier 320 is then invalidated. Accordingly, the integrity of the original entitlement 330 between the original unique system identifier 320 and the digital assets 332 is perpetuated by the new entitlement 430 between the new unique system identifier 420 and the digital assets 332. In certain embodiments, an old system comprising an original unique system identifier 320 is replaced with an entirely new system comprising a new unique system identifier 420. In these and other embodiments, the generation of a new entitlement 430 and the invalidation of the original unique system identifier 320 migrates the entitlement of the digital assets 332 from the old system to the new system. Skilled practitioners of the art will recognize that many such embodiments are possible and the foregoing is not intended to limit the spirit, scope, or intent of the invention.

FIG. 5 is a simplified block diagram of an encrypted unique system identifier generated from a set of system component identifiers in accordance with an embodiment of the invention. In this embodiment, a source unique system identifier 520 is generated from a plurality of original unique system component identifiers 502, which correspond to a plurality of system components contained in a target system. As shown in FIG. 5, the original unique system component identifiers 502 comprise a Model Number 304 'SA310J43, a Serial Number 306, sometimes referred to as a service tag number or a primary system identifier, 'SEM5239923875', a Factory ID 308 'AUS', a Timestamp Date 510 '111909', and a Timestamp Time 512 '14:27:26:34'. The original unique system component identifiers 502 likewise comprise an Original Motherboard ID 314 '19374WS238017BH', a Processor ID 316 '92348430-432919237', a Hard Drive ID 318 'L83747HJ3672', etc.

An encryption operation 524 is then performed on the source unique system identifier 520 to generate an original encrypted unique system identifier 528. In various embodiments, the encryption operation may comprise the use of a private key, a public key, key pairs, or any combination of keys and cryptographic operations such as implemented in a public key infrastructure (PKI). As an example, the original encrypted unique system identifier 528 may be generated using a private key associated with the manufacturer of the system and a public key associated with the system itself. In one embodiment, the Timestamp Date 510 '111909' and the Timestamp Time 512 '14:27:26:34' are likewise used to generate the encrypted unique system identifier 528. Skilled practitioners of the art will be familiar with such cryptographic operations and recognize that many such embodiments are possible and that the foregoing is not intended to limit the spirit, scope, or intent of the invention.

As described in greater detail herein, once generated, the original encrypted unique system identifier 528 is associated, such as through a binding operation, with predetermined digital assets 332 to generate a digital assets entitlement 530. As likewise described in greater detail herein, the digital assets entitlement 530 entitles a target system, which is associated with the original encrypted unique system identifier 528, to process the digital assets 332.

FIG. 6 is a simplified block diagram of a unique system identifier decrypted from an encrypted unique system identifier in accordance with an embodiment of the invention. It is not uncommon for system components to be replaced due to failure, erratic performance, becoming outmoded, or for other reasons. However, the replaced system component will typically have a different unique system component identifier. As a result, the entitlement association between a unique system identifier and predetermined digital assets may be compromised as a result of such a replacement, which in turn may prevent the target system from processing the digital assets.

In various embodiments, the unique system component identifier of the replacement system component is unknown until it is replaced in the target system. In these and other embodiments, the system component is replaced in the target system, the target system is then initiated (e.g., booted), and an inventory of unique system component identifiers is performed. In one embodiment, one or more unique system component identifiers, such as a serial number or service tag, are visible and may be visually inventoried. In another embodiment, one or more unique system component identifiers, such as a motherboard, processor, or hard drive serial number, are not visible and may be automatically inventoried.

As shown in FIG. 6, a new source unique system identifier 650 is generated from the inventoried unique system component identifiers. In one embodiment, a time stamp date and a time stamp time are components of the new source unique system identifier 650. In this embodiment, the time stamp date and a time stamp time are used to validate the authenticity of the new source unique system identifier 650. As an example, the provider of the replacement part may have stipulated that the replacement part be replaced on Nov. 12, 2009, between 8:00 AM and 6:00 PM. Accordingly, a time state date of Nov. 12, 2009 and a time stamp time of 16:33:42:05 would provide validation that the replacement part was replaced within the specified date and time interval.

An encryption operation 652 is then performed on the new source unique system identifier 650 to generate a new encrypted unique system identifier 628. As an example, the encryption operation may be performed using a private key associated with the target system and a public key associated with the provider of the replacement system component. The new encrypted unique system identifier 628 is then communicated to a digital asset entitlement system, which in turn performs a decryption operation 626 to generate a decrypted unique system identifier 622.

As likewise shown in FIG. 6, extract, transform, and load (ETL) and other database operations 634 are performed on the decrypted unique system identifier 622 to generate new unique system component identifiers 602. As shown in FIG. 6, the new unique system component identifiers now comprise a Model Number 304 'SA310J43, a Serial Number 306, 'SEM5239923875', a Factory ID 308 'AUS', a Timestamp Date 610 '112009', and a Timestamp Time 612 '16:33:4105'. The new unique system component identifiers 602 likewise comprise a New Motherboard ID 314 '56812FR853945PL', a Processor ID 316 '92348430-432919237', a Hard Drive ID 318 'L83747HJ3672', etc. In one embodiment, the Timestamp Date 610 and the Timestamp Time 612 are compared to previously authorized timestamp date and timestamp times to validate the authenticity of the new unique system component identifiers 602 and their corresponding decrypted unique system identifier 622. In this and other embodiments, if the decrypted unique system identifier 622 is validated, then a first set of operations are performed to remove the entitlement between the original encrypted unique system identifier and digital assets 332. A second set of operations are then performed to associate the new encrypted unique system identifier 628 with the digital assets 332 to generate a new entitlement 630. Accordingly, the integrity of the original entitlement between the original encrypted unique system identifier and the digital assets 332 is perpetuated by the new entitlement 630 between the new encrypted unique system identifier 628 and the digital assets 332.

In various other embodiments, the provider of the replacement system component is able to determine its associated unique system component identifier. In one embodiment, the unique system component identifier is known in advance. In another embodiment, the unique system component identifier may be one of a pool of, or a range of possible unique system component identifiers set aside for replacement purposes. As described in greater detail herein, a new source unique identifier is generated, using the unique system component identifier of the component to be replaced. Once the new source unique identifier is generated the unique system component identifier of the replaced system component is invalidated. In these and other embodiments, the system component is replaced in the target system, the target system is then initiated (e.g., booted), and an inventory of unique system component identifiers is performed. In one embodiment, one or more unique system component identifiers, such as a serial number or service tag, are visible and may be visually inventoried. In another embodiment, one or more unique system component identifiers, such as a motherboard, processor, or hard drive serial number, are not visible and may be automatically inventoried.

As shown in FIG. 6, a new source unique system identifier 650 is generated from the inventoried unique system component identifiers. In one embodiment, a time stamp date and a time stamp time are components of the new source unique system identifier 650. In this embodiment, the time stamp date and a time stamp time are used to validate the authenticity of the new source unique system identifier 650. An encryption operation 652 is then performed on the new source unique system identifier 650 to generate a new encrypted unique system identifier 628. As an example, the encryption operation may be performed using a private key associated with the target system and a public key associated with the provider of the replacement system component. The new encrypted unique system identifier 628 is then communicated to a digital asset entitlement system, which in turn performs a decryption operation 626 to generate decrypted unique system identifier 622.

Comparison operations 654 are then performed between the new source unique system identifier and the decrypted unique system identifier 622. If the comparison operations 654 are successful, then a first set of operations are performed to remove the entitlement between the original encrypted unique system identifier and digital assets 332. A second set of operations are then performed to associate the new encrypted unique system identifier 628 with the digital assets 332 to generate a new entitlement 630. Accordingly, the integrity of the original entitlement between the original encrypted unique system identifier and the digital assets 332 is perpetuated by the new entitlement 630 between the new encrypted unique system identifier 628 and the digital assets 332. Skilled practitioners of the art will recognize that many such embodiments are possible and the foregoing is not intended to limit the spirit, scope, or intent of the invention.

Figure 7A:
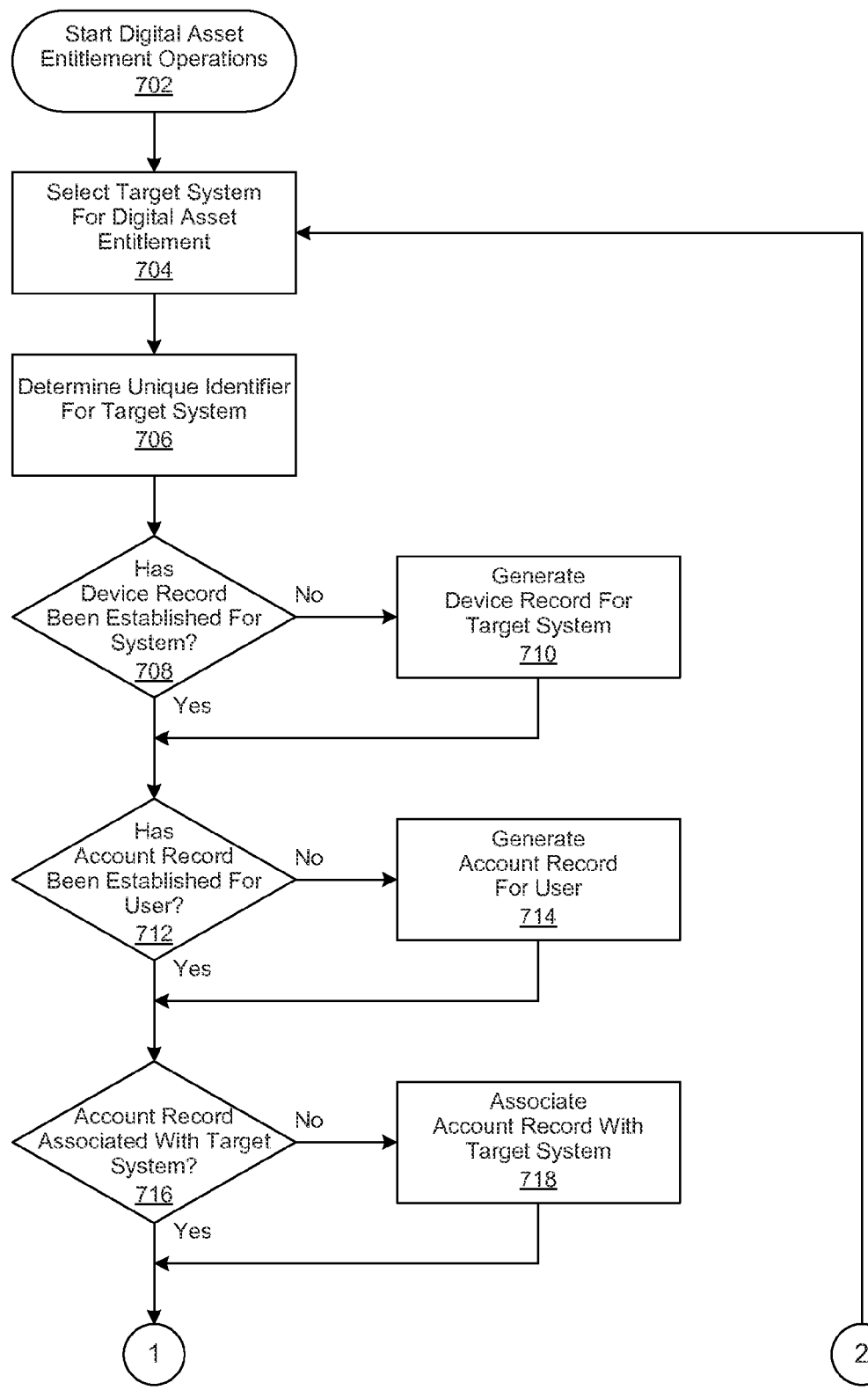
FIGS. 7*a*-*b* are a generalized flow chart of the performance of digital asset entitlement operations.
Figure 7B:
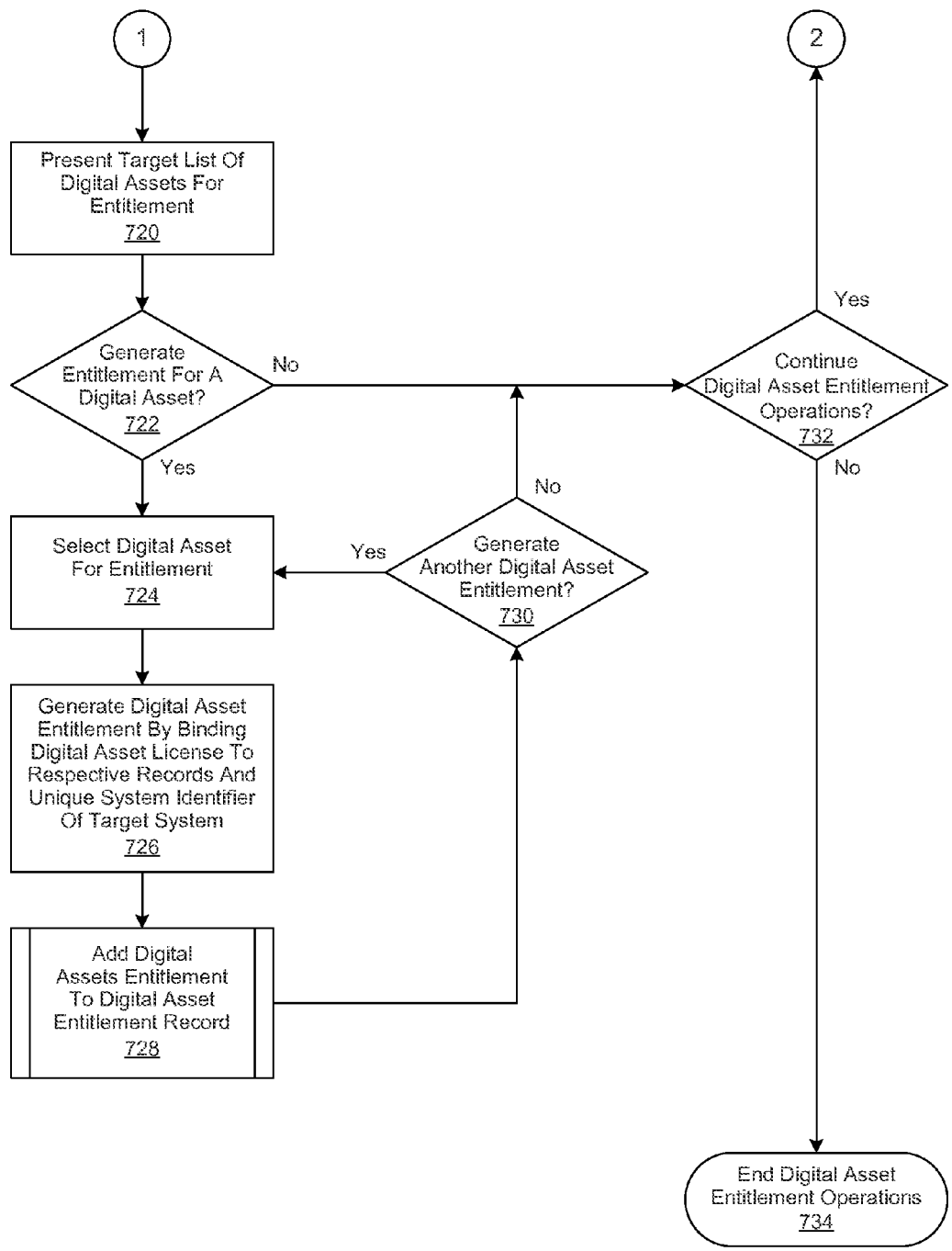
Figure 8A:
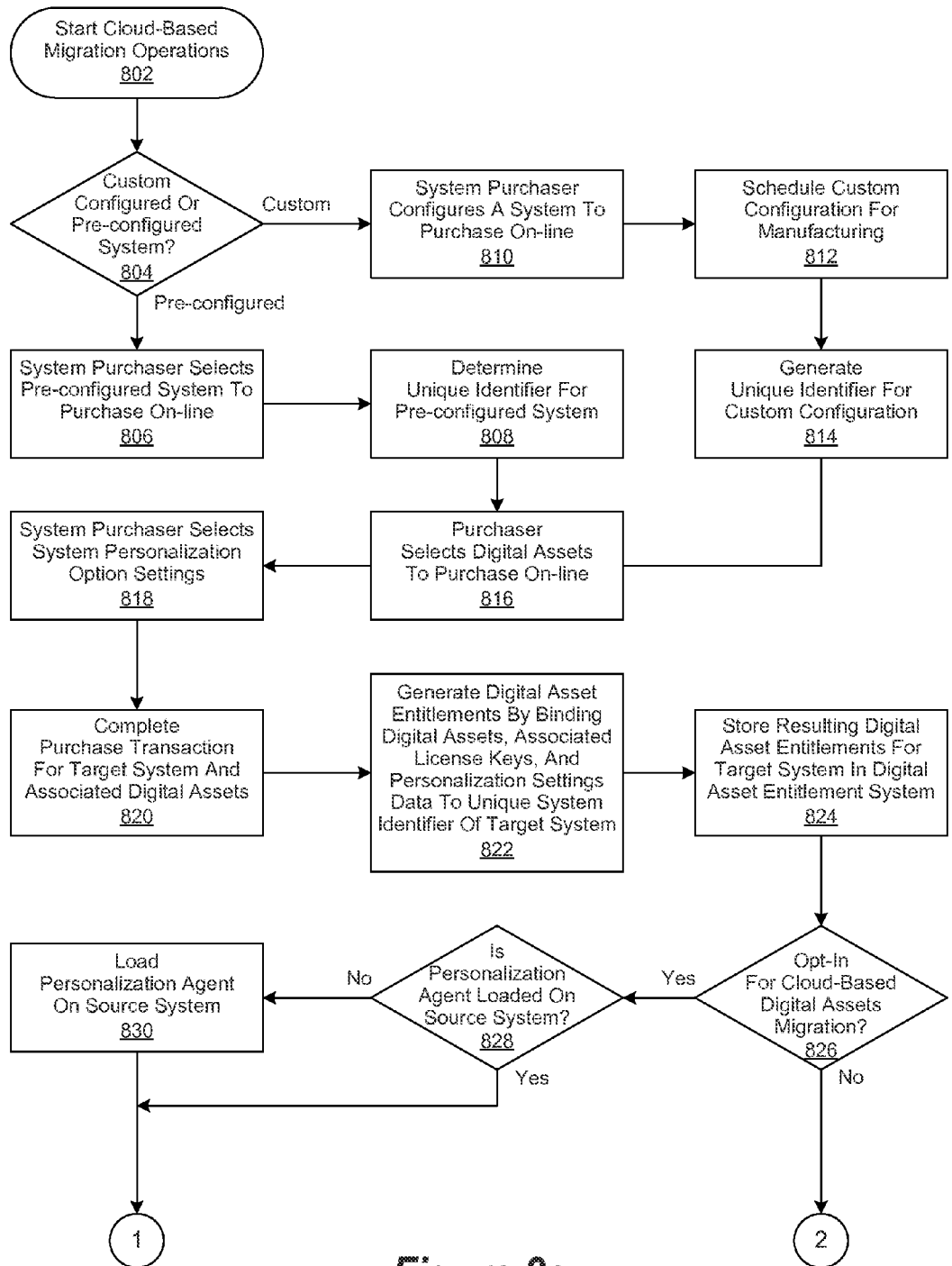
FIGS. 8*a*-*d* are a generalized flow chart of the performance of cloud-based digital assets migration operations.
Figure 8B:
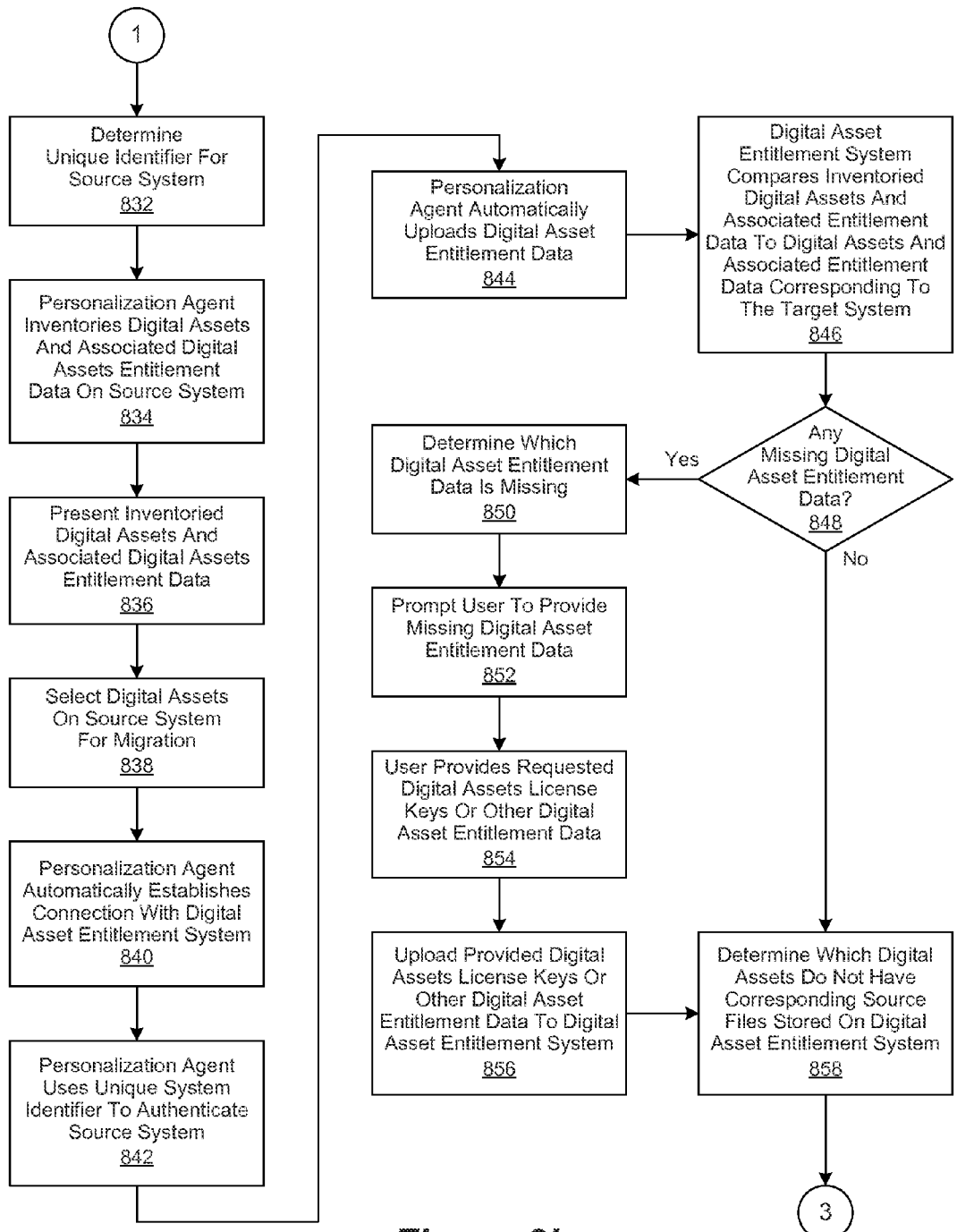
Figure 8C:
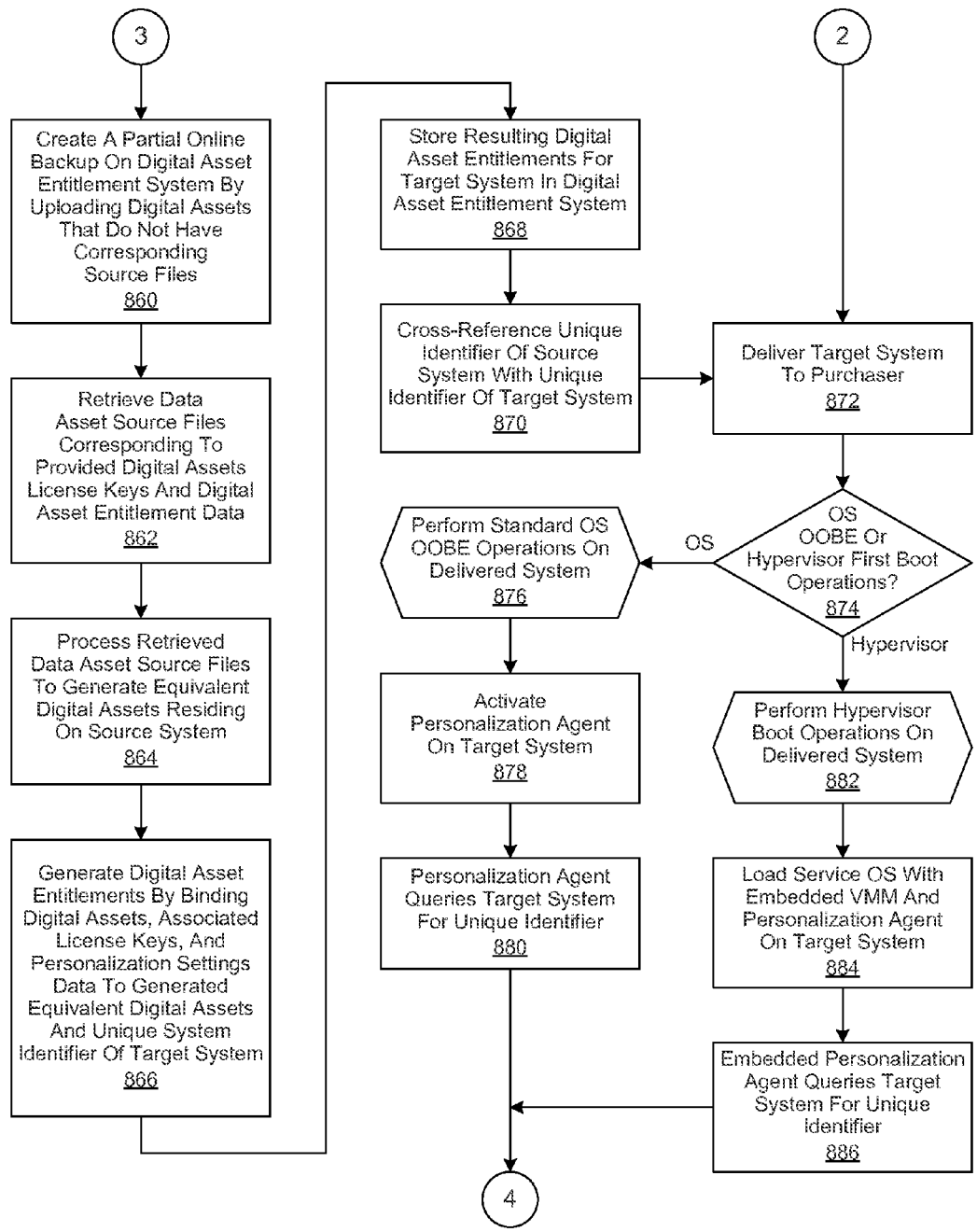
Figure 8D:
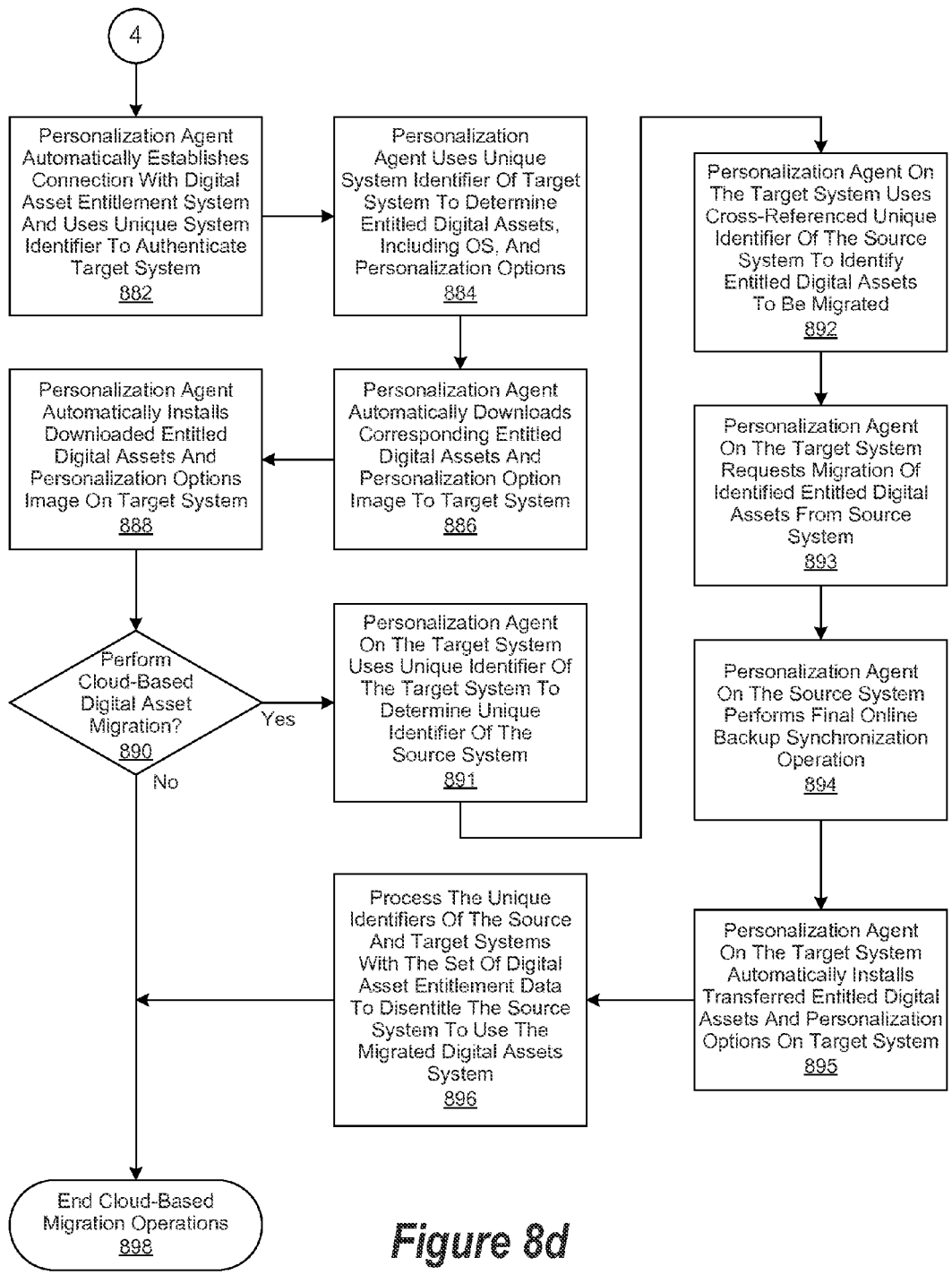

FIGS. 7a-b are a generalized flow chart of the performance of digital asset entitlement operations in an embodiment of the invention, in this embodiment, digital asset entitlement operations are started in step 702, followed by the selection of a target system in step 704 for digital assets entitlement. The unique system identifier of the target system as described in greater detail herein, is determined in step 706, followed by a determination being made in step 708 whether a device record has been established for the target system. If not, then the device record is generated in step 710. As used herein, a device record refers to a data record containing data related to a system which will receive an entitlement to process associated digital assets. In various embodiments, the unique system identifier of the target system is stored in the device record. In various embodiments, other records may be associated with the device record to further describe the system, such as its model, type, make, internal identifiers, etc.

Once the device record has been generated, or if it is determined in step 708 that it has already been established, then a determination is made in step 712 whether an account record has been established for a user. If not, then the account record is generated for the user in step 714. As used herein, an account record refers to a data record containing data related to the association of multiple devices or systems to one or more entities. In various embodiments, the entity may be a single individual or a group of individuals. As an example, the entity may be a household with multiple PCs, a small business with several employees, a large corporation with many employees, etc. Other records may be attached to the account to further describe the account holder, payment information related to the account, etc. Accounts may further be broken down or organized into sub-accounts as needed, such as to describe departments within an enterprise). In various embodiments, a user may be associated with a single device or system or multiple devices or systems in the account record. Conversely, a group of users may be associated with a single device or system or multiple devices in the account record. Further more groups of individual users may likewise be associated with groups of individual devices or systems. Those of skill in the art will recognize that many such associations are possible and the foregoing is not intended to limit the spirit, scope, or intent of the invention. Once the account record has been generated, or if it is determined in step 712 that it has already been established, then a determination is made in step 716 whether the account record is associated with the target system. If not, then the account record is associated with the target system in step 718.

Once the account record has been associated with the target system, or if it is determined in step 716 that it has already been associated, then a target list of digital assets is presented in step 720 for entitlement. A determination is then made in step 722 whether to generate an entitlement for a digital asset. If not, then a determination is made in step 732 whether to continue digital asset entitlement operations. If so, then the process is continued, proceeding with step 704. Otherwise digital asset entitlement operations are ended in step 734. However, if it is determined in step 722 to generate an entitlement for a digital asset, then a target digital asset is selected in step 724. A digital assets entitlement is then generated in step 726 by performing operations to associate the selected digital asset's corresponding license record with the aforementioned device record, account record, and other predetermined records. The resulting digital assets entitlement association is then added to the entitlement record in step 728. A determination is then made in step 730 whether to generate another digital assets entitlement. If so, the process is continued, proceeding with step 724. Otherwise, a determination is made in step 732 whether to continue digital asset entitlement operations. If so, then the process is continued, proceeding with step 704. Otherwise digital asset entitlement operations are ended in step 734.

FIG. 8 is a generalized flow chart of the performance of cloud-based digital assets migration operations in accordance with an embodiment of the invention. In this embodiment, cloud-based digital asset migration operations are begun in step 802, followed by purchaser of a new system determining in step 804 whether the new system is to be a custom-configured system or a pre-configured system. If it is determined in step 804 that the new system is to be pre-configured, then the system purchaser selects the target system for on-line purchase in step 806. The unique identifier for the selected pre-configured system is then determined in step 808. In one embodiment, the unique system identifier is stored in the BIOS of the pre-configured system.

However, if it is determined in step 804 that the new system is to be a custom-configured system, then the system purchaser configures the system for on-line purchase in step 810. The system is then manufactured in step 812 according to the custom configuration selections made by the purchaser in step 810. Once manufactured, a unique system identifier is generated in step 814, as described in greater detail herein. Then, or after the unique system identifier is determined for the pre-configured system in step 808, the system purchaser selects digital assets for on-line purchase in step 816, followed by selecting personalization option settings for the system in step 818.

A purchase transaction for the custom-configured or pre-configured target system and any associated digital assets and personalization options is completed in step 820. Digital asset entitlement operations, as described in greater detail herein, are then performed by a digital asset entitlement system in step 822 to bind the digital assets, the personalization options, and their respective digital assets entitlement data to the unique system identifier of the target system. The resulting digital asset entitlements for the target system are then stored in a digital asset entitlement system in step 824.

A determination is then made in step 826 whether to opt-in to cloud-based migration of digital assets. If so, then a determination is made in step 828 whether a personalization agent is loaded on the source system. If it is determined in step 828 that a personalization agent is not loaded on the source system, then it is loaded in step 830. Thereafter, or if it is determined in step 828 that a personalization agent is already loaded on the source system, the personalization agent queries the target system in step 832 to determine its unique system identifier. Inventory operations are then performed in step 834 by the personalization agent to inventory digital assets and any associated digital assets entitlement data installed on the source system.

Then, in step 836, the inventoried digital assets and associated digital assets entitlement data are presented to the user of the source system, who then selects digital assets to be migrated in step 838. In one embodiment, the inventoried digital assets and associated digital assets entitlement data are presented to the user of the source system. In this embodiment, the digital assets to be migrated from the source system to the target system are predetermined. In one embodiment, a third party, such as a system administrator, determines which digital assets are to be migrated. In another embodiment, a rules engine is implemented to determine which digital assets are to be migrated. In yet another embodiment, a policy engine is implemented to determine which digital assets are to be migrated. It will be appreciated that many such embodiments are possible and the foregoing is not intended to limit the spirit, scope or intent of the invention.

The personalization agent then automatically establishes a connection with the digital asset entitlement system in step 840. In turn, the personalization agent uses the unique system identifier to authenticate the source system in step 842. Once the source system is authenticated, the personalization agent then uploads the inventoried digital assets entitlement data associated with the source system to the data asset entitlement system in step 844. The digital asset entitlement system then performs comparison operations in step 846 between the inventoried digital assets and associated digital assets entitlement data and the digital assets and associated digital assets entitlement data corresponding to the unique system identifier of the target system.

A determination is then made in step 848 whether any digital asset entitlement data associated with the inventoried digital assets installed on the source system is missing. If so, then the missing digital asset entitlement data is determined in step 850, followed by the user being prompted in step 852 to provide the missing digital asset entitlement data (e.g., missing license keys). The user then provides the requested digital assets license keys or other missing digital assets entitlement data in step in step 854. The provided digital asset entitlement data is then uploaded to the digital asset entitlement system in step 856. Thereafter, or if it was determined in step 848 that no digital asset entitlement data associated with the inventoried digital assets installed on the source system was missing, then a determination is made in step 858 which of the inventoried digital assets do not having corresponding digital asset source files stored on the digital asset entitlement system.

A partial online backup is then created in step 860 on the digital asset entitlement system by uploading digital assets that do not have corresponding source files. The aforementioned corresponding data asset source files are then retrieved in step 862. Once retrieved, they are then processed in step 864 to generate digital assets equivalent to those currently residing on the source system.

Digital asset entitlements for both the digital assets uploaded in step 860, and the equivalent digital assets generated in step 864 are then generated, as described in greater detail herein, for the target system in step 866. The resulting digital asset entitlements for the target system are then stored in the digital asset entitlement system in step 868. The unique system identifier of the target system is then cross-referenced to the unique system identifier of the source system within the digital asset entitlement system in step 870. Then, or if it was determined in step 826 not to opt-in for cloud-based digital asset entitlement migration, the custom-configured or pre-configured system is then delivered to the system purchaser in step 872.

A determination is then made in step 874 whether to perform standard operating system (OS) out-of-the-box-experience (OOBE) or hypervisor first boot operations on the target system. If it is determined in step 874 to perform standard OS OOBE operations, then they are performed on the target system in step 876, followed by the activation of the previously-loaded personalization agent on the target system in step 878. The personalization agent then queries the target system for its unique system identifier in step 880. In various embodiments, the unique system identifier associated with the target system is stored in the target system's BIOS, flash memory, a hard disk, or other memory device.

However, if it is determined in step 874 to perform hypervisor (e.g., virtual machine monitor, or VMM) first boot operations on the target system, then they are performed in step 882. Then, in step 884, a service OS comprising an embedded virtual machine monitor (VMM) and an embedded personalization agent are loaded on the target system. The embedded personalization agent then queries the target system for its unique system identifier in step 886. Thereafter, or once the personalization agent queries the target system for its unique system identifier in step 880, the respective personalization agent automatically establishes a connection with the digital asset entitlement system in step 882 and uses the target system's unique system identifier to authenticate it to the digital asset entitlement system.

Then, in step 884, the unique system identifier is used by the personalization agent loaded on the target system to determine its entitled digital assets, including OS and personalization options. Once determined, the corresponding virtual software image comprising personalization option settings and digital assets, along with their associated digital assets entitlement data, is downloaded in step 886 to the target system. Once downloaded, the personalization agent provisions the target system by using the digital assets entitlement data in step 888 to install the virtual software image. A determination is then made in step 890 whether to perform cloud-based digital asset migration operations.

If so, then the personalization agent installed on the target system uses the unique system identifier of the target system in step 891 to determine the previously cross-referenced unique system identifier of the source system. The personalization agent installed on the target system then uses the cross-referenced unique identifier of the source system in step 892 to identify which entitled digital assets are to be migrated from the source system to the target system. Then, in step 893, the personalization agent installed on the target system places a request with the digital asset entitlement system to migrate the previously-identified digital assets currently residing on the source system to the target system. In response, the personalization agent installed on the source system performs a final online backup synchronization operation with the digital asset entitlement system in step 894 to accommodate any changes to the digital assets residing on the source system since its last online backup. The personalization agent installed on the target system then automatically installs the migrated entitled digital assets on the target system in step 895. The unique identifiers of the source and target system are then processed with the set of digital asset entitlement data in step 896 to disentitle the source system from using the migrated digital assets. Thereafter, or if it was determined in step 890 not to perform cloud-based digital asset migration, then cloud-based digital asset migration operations are then ended in step 898.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for migrating entitled digital assets, comprising:
    receiving a first identifier and a first set of entitlement data, the first identifier corresponding to a first system, the first set of entitlement data corresponding to a first set of digital assets installed on the first system;
    processing the first set of entitlement data and a set of digital asset source data to generate a second set of digital assets equivalent to the first set of digital assets;
    processing a second identifier corresponding to a second system, the first identifier, and the first set of entitlement data to generate a first set of digital asset entitlements entitling the second system to use the second set of digital assets;
    receiving the second identifier and a first request to migrate the second set of digital assets from the first system to the second system; and
    providing the second set of digital assets to the second system; and wherein
    the first system comprises a second set of entitlement data corresponding to a third set of digital assets installed on the first system;
    the second set of entitlement data and the third set of digital assets are received from the first system; and,
    the second identifier and the second set of entitlement data are processed to generate a second set of digital asset entitlements entitling the second system to use the third set of digital assets.

2. The method of claim 1, wherein the second system comprises a virtual machine.

3. The method of claim 1, wherein the first identifier, the second identifier and the first set of entitlement data are processed upon completion of the migration to disentitle the first system to use the first set of digital assets.

4. The method of claim 1, wherein the first identifier, the second identifier and the first set of entitlement data are processed upon completion of the migration to disentitle the first system to use the second set of digital assets.

5. The method of claim 1, further comprising:
    receiving the second identifier and a second request to migrate the third set of digital assets from the first system to the second system; and
    providing the third set of digital assets to the second system.

6. The method of claim 5, wherein the first identifier, the second identifier and the second set of entitlement data are processed upon completion of the migration to disentitle the first system to use the third set of digital assets.

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        receiving a first identifier and a first set of entitlement data, the first identifier corresponding to a first system, the first set of entitlement data corresponding to a first set of digital assets installed on the first system;
        processing the first set of entitlement data and a set of digital asset source data to generate a second set of digital assets equivalent to the first set of digital assets;
        processing a second identifier corresponding to a second system, the first identifier, and the first set of entitlement data to generate a first set of digital asset entitlements entitling the second system to use the second set of digital assets; receiving the second identifier and a first request to migrate the second set of digital assets from the first system to the second system; and
        providing the second set of digital assets to the second system; and wherein
    the first system comprises a second set of entitlement data corresponding to a third set of digital assets installed on the first system;
    the second set of entitlement data and the third set of digital assets are received from the first system; and,
    the second identifier and the second set of entitlement data are processed to generate a second set of digital asset entitlements entitling the second system to use the third set of digital assets.

8. The system of claim 7, wherein the second system comprises a virtual machine.

9. The system of claim 7, wherein the first identifier, the second identifier and the first set of entitlement data are processed upon completion of the migration to disentitle the first system to use the first set of digital assets.

10. The system of claim 7, wherein the first identifier, the second identifier and the first set of entitlement data are processed upon completion of the migration to disentitle the first system to use the second set of digital assets.

11. The system of claim 7, the instructions executable by the processor are further configured for:
    receiving the second identifier and a second request to migrate the third set of digital assets from the first system to the second system; and
    providing the third set of digital assets to the second system.

12. The system of claim 11, wherein the first identifier, the second identifier and the second set of entitlement data are processed upon completion of the migration to disentitle the first system to use the third set of digital assets.

13. A non-transitory, computer-readable storage medium embodying computer program code, the computer program code comprising computer executable instructions configured for:

receiving a first identifier and a first set of entitlement data, the first identifier corresponding to a first system, the first set of entitlement data corresponding to a first set of digital assets installed on the first system;

processing the first set of entitlement data and a set of digital asset source data to generate a second set of digital assets equivalent to the first set of digital assets;

processing a second identifier corresponding to a second system, the first identifier and the first set of entitlement data to generate a first set of digital asset entitlements entitling the second system to use the second set of digital assets; receiving the second identifier and a first request to migrate the second set of digital assets from the first system to the second system; and providing the second set of digital assets to the second system; and wherein the first system comprises a second set of entitlement data corresponding to a third set of digital assets installed on the first system;

the second set of entitlement data and the third set of digital assets are received from the first system; and, the second identifier and the second set of entitlement data are processed to generate a second set of digital asset entitlements entitling the second system to use the third set of digital assets.

14. The non-transitory, computer-readable storage medium of claim 13, wherein the second system comprises a virtual machine.

15. The non-transitory, computer-readable storage medium of claim 13, wherein the first identifier, the second identifier and the first set of entitlement data are processed upon completion of the migration to disentitle the first system to use the first set of digital assets.

16. The non-transitory, computer-readable storage medium of claim 13, wherein the first identifier, the second identifier and the first set of entitlement data are processed upon completion of the migration to disentitle the first system to use the second set of digital assets.

17. The non-transitory, computer-readable storage medium of claim 13, the computer executable instructions are further configured for:

receiving the second identifier and a second request to migrate the third set of digital assets from the first system to the second system; and providing the third set of digital assets to the second system.

18. The non-transitory, computer-readable storage medium of claim 17, wherein the first identifier, the second identifier and the second set of entitlement data are processed upon completion of the migration to disentitle the first system to use the third set of digital assets.

* * * * *